US005459760A

United States Patent [19]

Watanabe

[11] Patent Number: 5,459,760

[45] Date of Patent: Oct. 17, 1995

[54] TRANSMITTING AND RECEIVING APPARATUS

[75] Inventor: Masatoshi Watanabe, Tokyo, Japan

[73] Assignee: Matsushita Electric Industrial Co., Ltd., Osaka, Japan

[21] Appl. No.: 328,753

[22] Filed: Oct. 24, 1994

[30] Foreign Application Priority Data

Nov. 5, 1993 [JP] Japan .................................... 5-299132

[51] Int. Cl.[6] .................................................... H04B 1/713

[52] U.S. Cl. ................................ 375/202; 380/34; 455/69

[58] Field of Search .................................. 375/1; 380/34; 455/69

[56] References Cited

U.S. PATENT DOCUMENTS

| | | | |
|---|---|---|---|
| 4,222,115 | 9/1980 | Cooper et al. | 375/1 |
| 4,716,573 | 12/1987 | Bergström et al. | 375/1 |
| 5,353,341 | 10/1994 | Gillis et al. | 375/1 X |

FOREIGN PATENT DOCUMENTS 2247379 2/1992 United Kingdom .

OTHER PUBLICATIONS

Munday et al, "Jaguar–V Frequency–Hopping Radio System", IEEE Proceedings F. Communications, Radar & 1,3 Signal Processing, vol. 129, No. 3, Jun. 1982, Stevenage GB, pp. 213–222.

Keiji Takakusaki et al., "A Coherent Demodulator for Fast–Frequency–Hopping–Spread–Spectrum–Signal employing a Adaptive Algorithm", *Technical Report Of IEICE.* SAT92–63, RCS92–97, (1992–11), pp. 77–82.

*Primary Examiner*—Bernarr E. Gregory

*Attorney, Agent, or Firm*—Spencer, Frank & Schneider

[57] ABSTRACT

In a transmitting and receiving apparatus for transmission and reception of signals based on the frequency hopping spread spectrum scheme, hopping patterns used for a transmitter and a receiver are respectively constructed of frequencies which belong to the same frequency band and which are selected such that frequencies of both hopping patterns do not overlap with each other at the same instant and besides, there are provided a level detecting circuit for detecting a received power level of a received signal at each hopping frequency and a level control circuit for performing transmission power control for each hopping frequency by using information detected by the level detecting circuit.

6 Claims, 4 Drawing Sheets

TRANSMISSION DATA
CODER
MODULATOR
FIRST FREQUENCY CONTROL CIRCUIT
FIRST FREQUENCY SYNTHESIZER
FIRST BPF
1
3
4
5
6
7
8
9
10
11

SECOND BPF
SYNCHRONOUS CIRCUIT
SECOND FREQUENCY SYNTHESIZER
SECONT FREQUENCY CONTROL CIRCUIT
DEMODULATOR
DECODER
RECEPTION DATA
12
13
14
15
16
17
18
19
20
21

TRANSMISSION DATA
CODER
MODULATOR
FIRST BPF
LEVEL CONTROL CIRCUIT
SYNCHRONOUS CIRCUIT
FREQUENCY CONTROL CIRCUIT
DELAY CIRCUIT
FIRST FREQUENCY SYNTHESIZER
SECOND FREQUENCY SYNTHESIZER
SECOND BPF
LEVEL DETECTING CIRCUIT
DEMODULATOR
DECODER
RECEPTION DATA

TRANSMITTING AND RECEIVING APPARATUS

BACKGROUND OF THE INVENTION

FIELD OF THE INVENTION

The present invention relates to a transmitting and receiving apparatus based on the frequency hopping spread spectrum scheme and used for mobile communication in, for example, digital car telephones and portable telephones and more particularly, to this type of apparatus which is constructed so as to easily practice transmission power control aiming at countermeasures against fading.

DESCRIPTION OF THE RELATED ART

In the frequency hopping spread spectrum scheme, a frequency of a carrier used for modulation of a digital signal is changed with time. In consequence, the frequency can be averted from staying at a value which degrades the communication condition and the quality of communication can be uniformed.

As shown in FIGS. 1A and 1B, a conventional transmitting and receiving apparatus based on the frequency hopping spread spectrum scheme comprises a transmitter 1 including a coder 3 for coding transmission data, a modulator 4 for modulating a coded signal to a first intermediate frequency signal 5, a first frequency synthesizer 6 for performing the frequency conversion of the first intermediate frequency signal 5 into an RF (radio frequency) signal 9, a first frequency control circuit 7 for controlling a carrier frequency used for the frequency conversion by the first frequency synthesizer 6, a first band-pass filter (BPF) 10 for cutting surplus signals, and an antenna 11 for transmission and reception of an electric wave.

The apparatus further comprises a receiver 12 including a second BPF 13 for cutting surplus signals from a received signal, a synchronous circuit 15 for setting up synchronization on the basis of a received signal 14, a second frequency synthesizer 18 for converting the RF received signal 14 into a second intermediate frequency signal 19 by multiplying the received signal 14 by a carrier frequency, a second frequency control circuit 16 for switching the carrier frequency used for the frequency conversion by the second frequency synthesizer 18 in accordance with the same pattern as that in the transmitter, a demodulator 20 for demodulating the second intermediate frequency signal 19, and a decoder 21 for performing decoding to original data.

As exemplified in FIG. 2, the first frequency control circuit 7 of the transmitter 1 sequentially switches the carrier frequency in the first frequency synthesizer 6 to frequencies f1, f2, f3 and f4 each time that a constant time has elapsed. This frequency changing pattern (frequency hopping pattern) is predetermined. The minimum unit of the frequency hopping pattern (defining the time for which the same frequency continues) is termed a chip. FIG. 2 shows a hopping pattern having a period T equal to four chips.

In the transmitting and receiving apparatus shown in FIGS. 1A and 1B, transmission data of (0, 1) inputted to the transmitter 1 is coded by the coder 3 and then converted by the modulator 4 into the first intermediate frequency signal 5. On the other hand, the first frequency synthesizer 6 is driven by the first frequency control circuit 7 to switch the carrier frequency in accordance with a predetermined frequency hopping pattern 8, thereby performing the frequency conversion of the first intermediate signal 5 into the RF signal 9. The thus converted signal is then passed through the first BPF 10 and transmitted from the antenna 11.

In the receiver 12, synchronization is set up by the synchronous circuit 15 for the received signal 14 which has passed through the second BPF 13 and thereafter the second frequency synthesizer 18 is driven by the second frequency control circuit 16 to convert the received signal 14 into the second intermediate frequency signal 19 in accordance with a frequency hopping pattern 17 which is the same as that in the transmitter 1. The second intermediate frequency signal 19 is then demodulated by the demodulator 20 and converted by the decoder 21 into original data (reception data).

In a conventional car-telephone transmitting and receiving apparatus based on the frequency hopping spread spectrum scheme, in an effort to permit bidirectional communication, hopping patterns are set as shown in FIG. 2 by using different frequency bands for an upward circuit from a mobile station to a base station and a downward circuit from the base station to the mobile station. Accordingly, the first frequency synthesizer 6 of the transmitter 1 in the base station and the second frequency synthesizer 18 of the receiver 12 in the mobile station are controlled such that the carrier frequency is switched in order of frequencies F1, F2, F3 and F4 whereas the first frequency synthesizer 6 of the transmitter 1 in the mobile station and the second frequency synthesizer 18 of the receiver 12 in the base station are controlled such that the carrier frequency is switched in order of frequencies f1, f2, f3 and f4.

A TDD (Time Division Duplex) scheme has hitherto been known as a spread spectrum scheme using the same frequency band for upward and downward circuits. In this scheme, not a frequency hopping signal but a direct sequence signal is used to carry out the spread spectrum and as shown in FIG. 3, transmission and reception are alternated in a time sharing fashion through switching operation.

Since in this TDD scheme the time is divided into two kinds of time slots respectively allotted to transmission and reception, the transmitter once stores transmission signals in a memory and forms them into a packet which in turn is transmitted at a doubled rate whereas the receiver stores received signals in a memory and thereafter reads the stored signals sequentially.

The transmitting and receiving apparatus adopting this TDD scheme is required to process signals into a packet and needs a mechanism for doubling the transmission speed and a switch operation mechanism for on/off operation of transmission, thus being complicated in construction.

In spite of the fact that the conventional transmitting and receiving apparatus using the frequency hopping spread spectrum signal has an advantage of a simpler construction than that of the TDD scheme, the frequency bands used for upward and downward circuits are different from each other, giving rise to problems as below.

The mobile communication takes countermeasures against fading which degrades the circuit quality and to this end, transmission power control is effected in which a fluctuation in received signal power level due to fading is compensated by adjusting transmission power.

When the transmission power control is carried out with the conventional transmitting and receiving apparatus using the frequency hopping spread spectrum signal, the following procedures are taken.

Firstly, a mobile station transmits a signal to the base station. Receiving the signal, the base station presumes circuit conditions of an upward circuit on the basis of signal power received from the mobile station and transmits information about the circuit conditions to the mobile station through a downward circuit. When receiving the information, the mobile station controls transmission power on the basis of the received information.

Because of the procedures taken as above, the mobile station is allowed to control transmission power on the basis of the past circuit conditions for a time required for propagation from the base station to the mobile station and when the signal power level fluctuates at a high rate owing to fading, it is difficult to follow this high-rate level fluctuation.

In the transmitter, on the other hand, many frequency slots obtained by dividing a wide frequency band are used by being switched in accordance with a hopping pattern and therefore when it is desired to send, from the base station to the mobile station, information about compensation for fading of all of the frequency slots, there results a drastic increase in the amount of control information to be carried on the downward circuit.

SUMMARY OF THE INVENTION

The present invention contemplates elimination of the conventional problems as above and an object of the present invention is to provide a transmitting and receiving apparatus of simplified construction which can perform high speed and highly accurate transmission power control.

According to a transmitting and receiving apparatus for transmission and reception of signals based on the frequency hopping spread spectrum scheme, hopping patterns used for a transmitter and a receiver are respectively constructed of frequencies which belong to the same frequency band and which are selected such that bidirectional hopping patterns do not overlap with each other at the same instant and besides, there are provided level detecting means for detecting a received power level of a received signal at each hopping frequency and level control means for performing transmission power control for each hopping frequency by using information detected by the level detecting means.

A hopping pattern used in the receiver is delayed by N chips (N being integer) to be used as a hopping pattern for the transmitter.

In the transmitting and receiving apparatus constructed as above, circuit conditions at the time that a signal is transmitted at each hopping frequency can be grasped immediately from a received power level of a received signal. Accordingly, highly accurate transmission power control can be executed quickly.

Since the hopping pattern used in the transmitter is delayed by N chips (N being integer) relative to the hopping pattern used in the receiver, transmission power control can always be carried out upon transmission of a signal by making reference to a received power level which precedes by N chips.

DESCRIPTION OF THE PREFERRED EMBODIMENTS

Figure 1A:
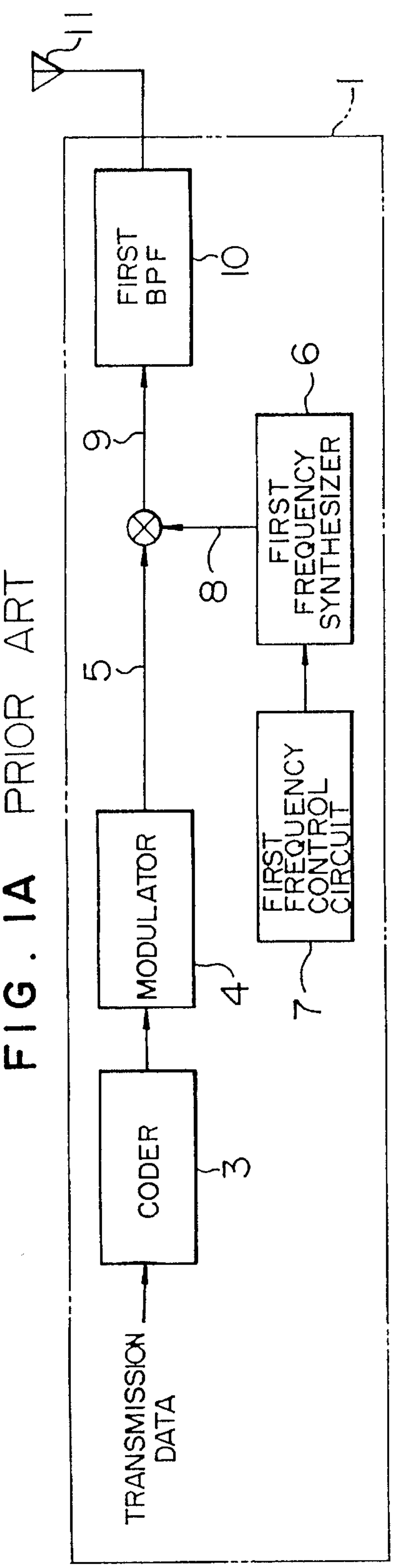
FIG. 1A is a block diagram showing the construction of a transmitter of a conventional transmitting and receiving apparatus.
Figure 1B:
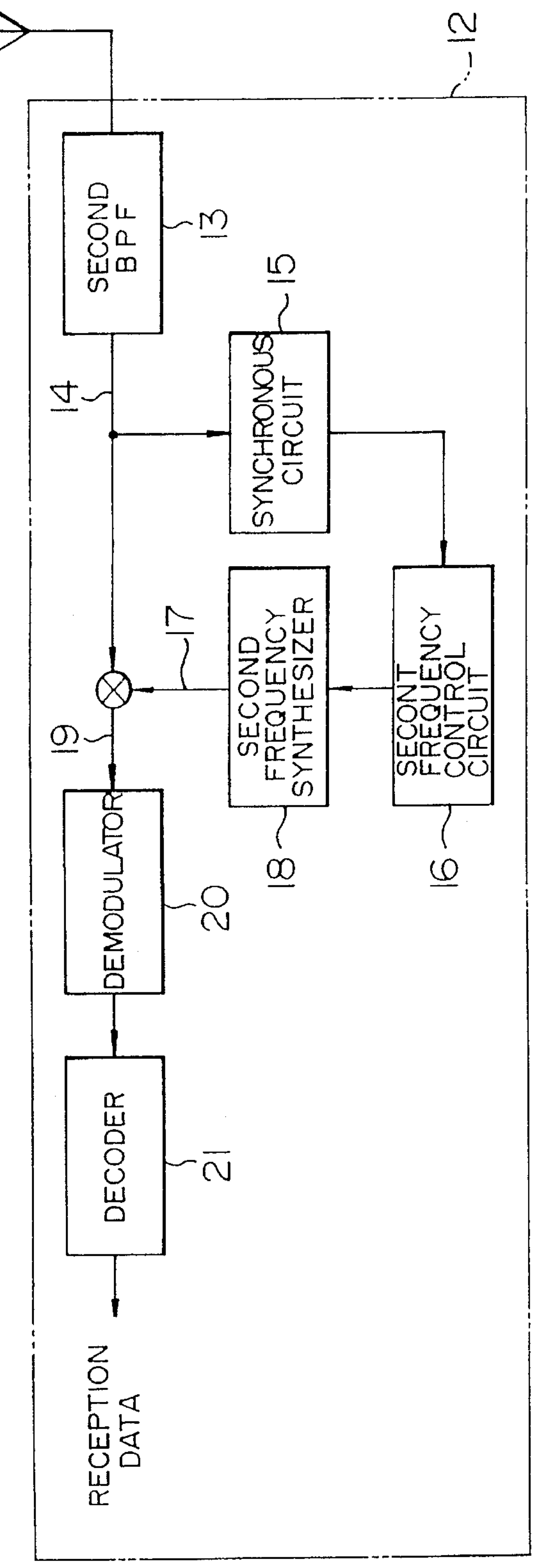
FIG. 1B is a block diagram showing the construction of a receiver of the conventional transmitting and receiving apparatus.
Figure 2:
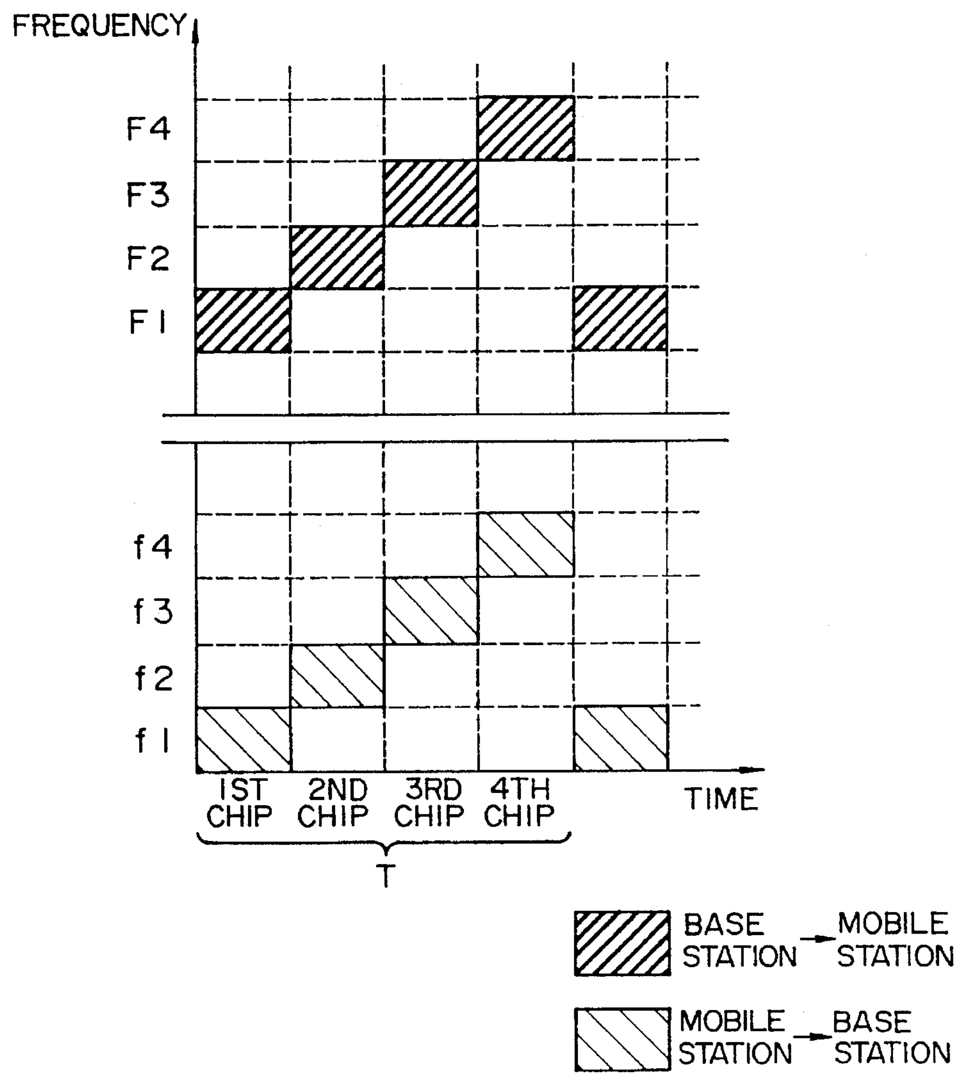
FIG. 2 shows an example of hopping patterns used in the conventional transmitting and receiving apparatus.
Figure 3:
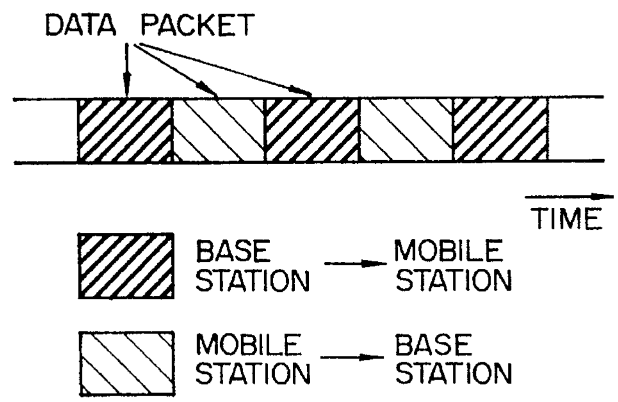
FIG. 3 is a diagram showing the relation between transmission and reception in a conventional TDD scheme.
Figure 4:
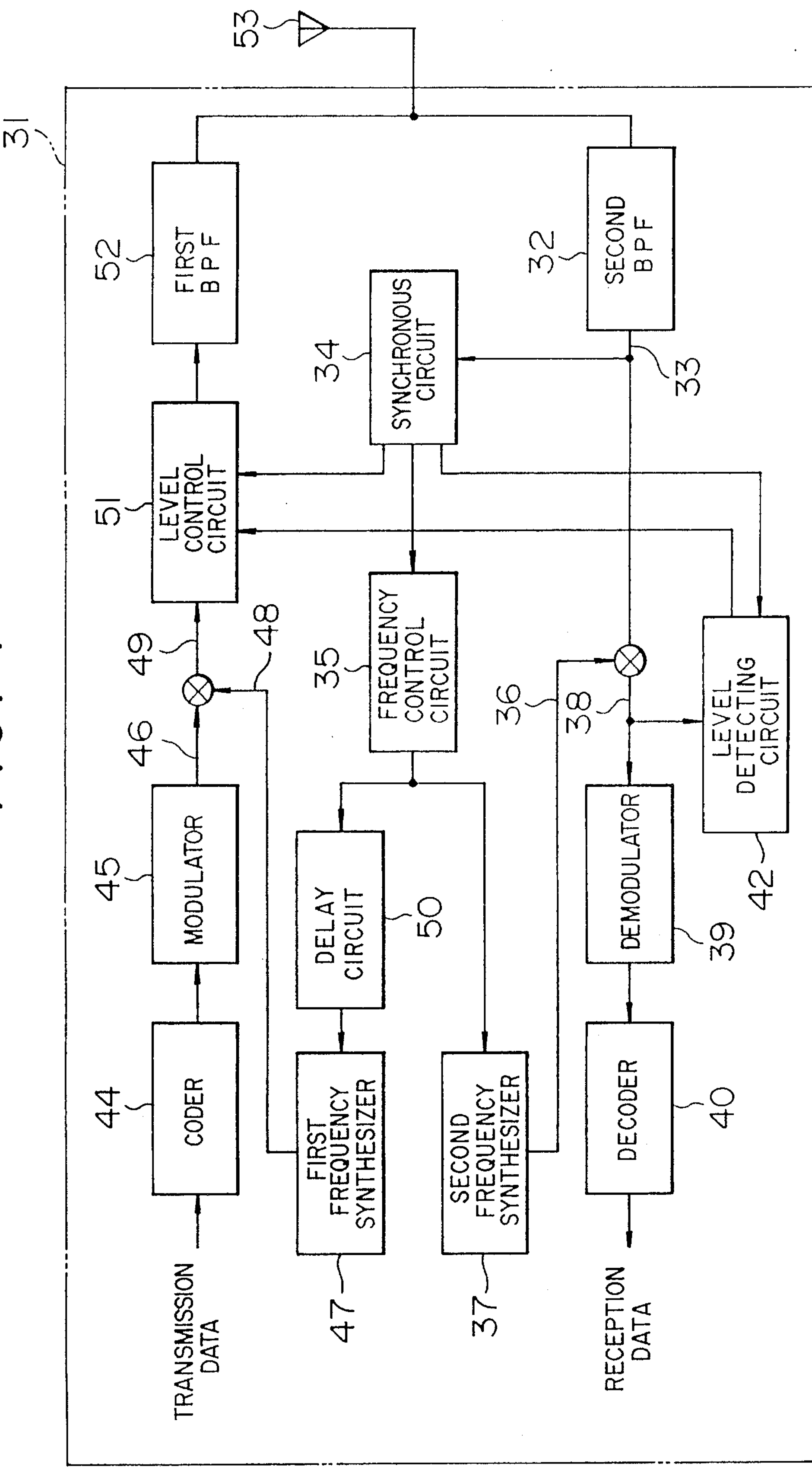
FIG. 4 is a block diagram showing the construction of a transmitting and receiving apparatus according to an embodiment of the present invention.

Referring to FIG. 4, there is illustrated the construction of a transmitting and receiving apparatus 31 in a mobile station according to an embodiment of the present invention.

The transmitting and receiving apparatus 31 comprises a transmitter including a coder 44 for coding transmission data, a modulator 45 for modulating an output signal of the coder 44 to a first intermediate frequency signal 46, a first frequency synthesizer 47 for performing the frequency conversion of the first intermediate frequency signal 46 into an RF signal 49, a frequency control circuit 35 for controlling switching of a carrier frequency of the first frequency synthesizer 47 in accordance with a frequency hopping pattern, a delay circuit 50 for delaying a control signal delivered out of the frequency control circuit 35 and applying it to the first frequency synthesizer 47, a level control circuit 51 for controlling a transmission power level of the RF signal 49, a first BPF 52, and an antenna 53.

The apparatus 31 further comprises a receiver including a second BPF 32 connected to the antenna 53, a synchronizing circuit 34, a second frequency synthesizer 37 for converting a received signal 33 into a second intermediate frequency signal 38 under the direction of the switching control of carrier frequency by the frequency control circuit 35, a demodulator 39, a decoder 40 for delivering reception data 41, and a level detecting circuit 42 for detecting a received power level of the second intermediate frequency signal 38.

When a signal is received in the receiver of the transmitting and receiving apparatus 31, the synchronizing circuit 34 sets up synchronization on the basis of the received signal 33 which has passed through the second BPF 32, the frequency control circuit 35 drives the second frequency synthesizer 37, and the second frequency synthesizer 37 converts the received signal 33 into the second intermediate frequency signal 38 in accordance with a predetermined frequency hopping pattern 36. Then, the thus converted signal is demodulated by the demodulator 39 and decoded to the reception data 41 by the decoder 40. The level detecting circuit 42 determines a received power level for each chip of frequency hopping in the second intermediate frequency signal 38.

In the transmitter, the coder 44 codes the transmission data 43 and then the modulator 45 modulates the output signal of the coder 44 to the first intermediate frequency signal 46. The first frequency synthesizer 47 is driven by the frequency control circuit 35 to switch the carrier frequency in accordance with a frequency hopping pattern 48, thereby performing the frequency conversion of the first intermediate frequency signal 46 into the RF signal 49.

The frequency hopping pattern used for the transmission has the same use frequency band and period as those of the hopping pattern used for reception and is synchronous therewith. But the hopping pattern is set such that the same frequencies for transmission and reception do not overlap with each other at the same instant, thereby permitting bidirectional communication.

Figure 5:
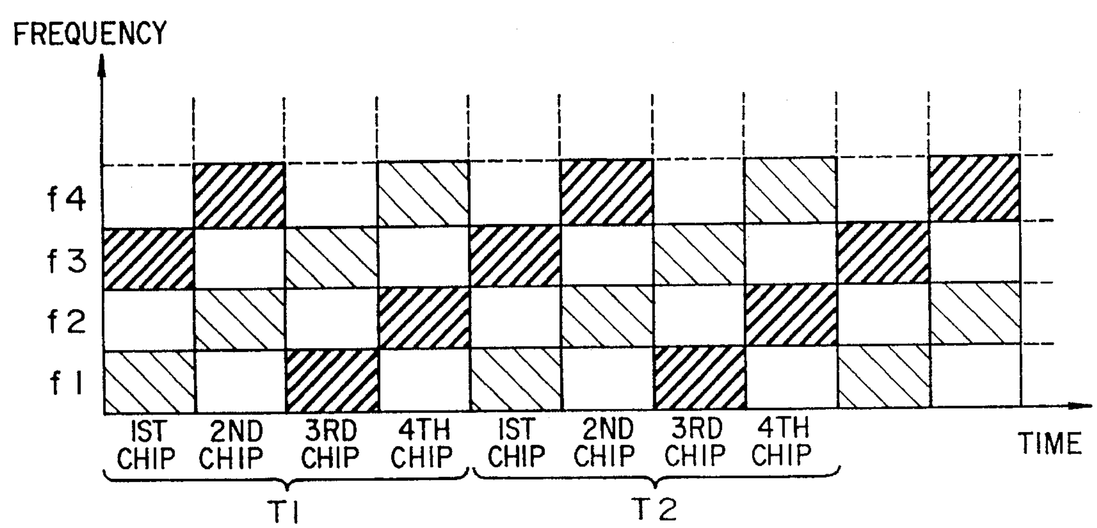
FIG. 5 shows an example of a hopping pattern used in the transmitting and receiving apparatus according to the embodiment.

In the transmitting and receiving apparatus 31 of FIG. 4, the hopping pattern 48 used for transmission is generated by delaying the hopping pattern 36 used for reception by a few chips by means of the delay circuit 50. FIG. 5 shows hopping patterns used for transmission and reception in the present embodiment, indicating that the hopping pattern for transmission delays by 2 chips relative to the hopping pattern for reception.

A signal subject to hopping is inputted to the level control circuit 51, and the level control circuit 51 applies transmission power control to this signal by using a received power level for each chip obtained from the level detecting circuit 42. A signal subject to the transmission power control is passed through the first BPF 52 and transmitted from the antenna 53.

A method for transmission power control employed herein will be described with reference to FIG. 5. In FIG. 5, "T" represents the period of the hopping patterns. The level detecting circuit 42 detects a level of received power for each chip. It is now assumed that the level detecting circuit 42 detects, from the received signal 38 converted to the intermediate frequency, received power of a carrier of frequency f3 at the first chip during the first period T1, information to this effect is sent to the level control circuit 51 which in turn determines on the basis of this information a transmission power level for the next transmission using the carrier frequency f3.

The transmitter transmits a signal by using the carrier frequency f3 at the third chip during the first period T1 and at that time, the previously determined value is used as a transmission power level. Similarly, a power level used for transmission of a signal by the carrier frequency f4 at the fourth chip during the first period T1 is determined from a received power level of a received signal at the second chip during the first period T1, and a transmission power level used for transmission of a signal by the carrier frequency f1 at the first chip during the second period T2 is determined from a received power level of a received signal at the third chip during the first period T1. By repeating the procedures as above, transmission power control for each chip is carried out.

To meet an instance where the rate of hoping is higher than the period of the transmission power control processing or the fading fluctuates slowly, information about a received power level at the first chip during the first period T1 can be used for transmission power control at the third chip during the second period T2.

The transmitting and receiving apparatus 31 can immediately grasp the circuit conditions upon transmission of a signal at each hopping frequency from a received power level of a received signal and can therefore execute highly accurate transmission power control quickly.

I claim:

1. In an apparatus including a transmitter and a receiver for transmission and reception of signals in a frequency hopping spread spectrum system, the improvement comprising:

means for constructing frequency hopping patterns respectively for the transmitter and the receiver which use frequencies belonging to the same frequency band, the frequency hopping patterns being constructed so that the same frequencies for transmission and reception do not overlap with each other at the same instant;

level detecting means for detecting a received power level of a received signal at each hopping frequency; and level control means coupled to said level detecting means for performing transmission power control for each hopping frequency in response to the power level detected by said level detecting means.

2. The apparatus according to claim 1 wherein said constructing means includes means for delaying the frequency hopping pattern used for said transmitter relative to the frequency hopping pattern used for said receiver by N chips, where N is an integer.

3. A transmitting and receiving apparatus in a frequency hopping system employing a predetermined pattern of frequency hopping, comprising:

a transmitter including:

a coder for coding transmission data to produce a coded signal;

a modulator for modulating the coded signal to produce a first intermediate frequency signal;

a first controllable frequency synthesizer for producing a first carrier signal;

a frequency control circuit for producing a control signal for switching the frequency of the first controllable frequency synthesizer in accordance with the predetermined pattern of frequency hopping;

a delay circuit coupled between the frequency control circuit and the first controllable frequency synthesizer for delaying the control signal produced by the frequency control circuit and applying the delayed control signal to the first controllable frequency synthesizer;

means for combining the first carrier signal and the first intermediate frequency signal for converting the first intermediate signal into an RF signal; and a level control circuit for controlling a transmission power level of the RF signal in response to a detected power level; and a receiver including:

a synchronizing circuit for synchronizing operation of the transmitter and receiver on the basis of a received signal;

a second controllable frequency synthesizer responsive to the control signal of the frequency control circuit for producing a second carrier signal in accordance with the predetermined pattern of frequency hopping;

means for combining the second carrier signal and the received signal for converting the received signal into a second intermediate frequency signal; and a level detecting circuit for detecting a power level of the second intermediate frequency signal and delivering the detected power level to the level control circuit.

4. The apparatus according to claim 3, wherein said delay circuit delays the pattern of frequency hopping used for the transmitter by delaying the pattern of frequency hopping used for the receiver by N chips, where N is an integer.

5. The apparatus according to claim 3, wherein said level detecting circuit detects the power level of the second intermediate frequency signal at each hopping frequency and said level control circuit controls transmission power level for each hopping frequency in response to the level detecting circuit.

6. The apparatus according to claim 5, wherein said delay circuit delays the pattern of frequency hopping used for the transmitter by delaying the pattern of frequency hopping used for the receiver by N chips, where N is an integer.

* * * * *